United States Patent
Lorenzen

(10) Patent No.: US 7,277,418 B2
(45) Date of Patent: Oct. 2, 2007

(54) PROCESS FOR DETERMINING A TIME LAPSE BETWEEN A TRIGGER SIGNAL AND A PILOT SEQUENCE OF A CDMA HIGH FREQUENCY SIGNAL

(75) Inventor: Rolf Lorenzen, Unterhaching (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 730 days.

(21) Appl. No.: 10/144,183

(22) Filed: May 13, 2002

(65) Prior Publication Data

US 2002/0181431 A1   Dec. 5, 2002

(30) Foreign Application Priority Data

Jun. 1, 2001   (DE) ............................... 101 26 831

(51) Int. Cl.
*H04B 7/216*   (2006.01)
*H04B 17/00*   (2006.01)

(52) U.S. Cl. ...................................... 370/342; 375/226

(58) Field of Classification Search ..................... None
See application file for complete search history.

(56) References Cited

U.S. PATENT DOCUMENTS

| | | | | |
|---|---|---|---|---|
| 5,946,359 A * | 8/1999 | Tajiri et al. | ............... | 375/331 |
| 5,974,087 A * | 10/1999 | Nowara | ............... | 375/226 |
| 6,249,253 B1 * | 6/2001 | Nielsen et al. | ............... | 342/463 |
| 6,353,412 B1 * | 3/2002 | Soliman | ............... | 342/387 |
| 6,377,585 B1 * | 4/2002 | Funderburk et al. | ........ | 370/441 |
| 6,901,264 B2 * | 5/2005 | Myr | ........................ | 455/456.5 |

FOREIGN PATENT DOCUMENTS

| | | |
|---|---|---|
| DE | 199 28 982 A1 | 1/2000 |
| DE | 198 36 888 A1 | 2/2000 |
| WO | WO97/07646 A1 | 2/1997 |

OTHER PUBLICATIONS

Ojanpera, Tero et al., "Wideband CDMA for Third Generation Mobile Communications" The Artech HouseUniversal Personal Communications Series, 1998, pp. 106-107.
Abstract of JP 2000307474 A, Michiaki et al., Nov. 2, 2000.

* cited by examiner

*Primary Examiner*—Andrew C. Lee
*Assistant Examiner*—Clemence Han
(74) *Attorney, Agent, or Firm*—Caesar, Rivise, Bernstein, Cohen & Pokotilow, Ltd.

(57) ABSTRACT

A process for determining a time lapse between a trigger signal and a start of a cyclic sequence of a pilot signal of a CDMA high frequency signal includes: simultaneously scanning and storing the trigger signal and the pilot signal; comparing the trigger signal with a trigger threshold to capture a time ($t_{trig}$) to reach the trigger threshold; comparing the trigger signal with a trigger threshold to capture a time ($t_{trig}$) to reach the trigger threshold; generating a CDMA baseband signal by transforming the CDMA high frequency signal into a complex baseband; correlating the CDMA baseband signal with a cyclic reference sequence to capture the time ($t_{pn}$) up to the start of the cyclic sequence of the pilot signal; and subtracting $t_{trig}$ from $t_{pn}$ to determine the lapse in time.

4 Claims, 2 Drawing Sheets

PROCESS FOR DETERMINING A TIME LAPSE BETWEEN A TRIGGER SIGNAL AND A PILOT SEQUENCE OF A CDMA HIGH FREQUENCY SIGNAL

BACKGROUND OF THE INVENTION

1. Field of Invention

This invention relates to a process for the determination of the time lapse between a trigger signal and the start of a cyclic sequence of a pilot signal of a Code Division Multiple Access (hereinafter, "CDMA") high frequency signal.

2. Description of Related Art

As a matter of example in Tero Ojanperä and Ramjee Prasad, "Wideband CDMA for Third Generation Mobile Communications" Artech House, Boston, London, ISBN 0-89006-738-X, 1998, page 106, a description is given to the effect that Wideband CDMA Signals have a pilot signal with a cyclic pilot sequence. Such CDMA-signals were produced from test equipment, namely signal generators, which, besides the high frequency output also possess a trigger release for the initiation of further signal generators. In one special application case, for example, a CDMA high frequency signal was combined with a Global Positioning System (hereinafter, "GPS") signal, which was made in a GPS signal generator. In this instance, a trigger entry port of the GPS signal generator was connected with the trigger output port of the CDMA test equipment. Furthermore, the high frequency output ports of the CDMA test equipment and those of the GPS signal generator were interconnected. These, for example, were conducted to a mobile station. By means of the synchronization of the GPS signal to the CDMA signal, the GPS signal generator orients itself to the trigger impulses sent to it from the CDMA test equipment. In doing this, it became necessary, however, that the chronological state of the trigger signal, relative to the CDMA signal at the high frequency output port of the CDMA test equipment be previously precisely determined. This determination is the object of the present invention.

All references cited herein are incorporated herein by reference in their entireties.

BRIEF SUMMARY OF THE INVENTION

The purpose of the invention is to create a process for the determination of the time lapse between a trigger signal and the start of a cyclic sequence of a pilot signal of a CDMA high frequency signal, which can be simply carried out and at no great expense in hardware.

In accord with the invention, the trigger signal and the CDMA high frequency signal are simultaneously scanned and stored by means of a 2-channel memory oscilloscope. The trigger signal is compared with a given trigger threshold, whereby the time up to the reaching of the said trigger threshold is registered. The CDMA high frequency signal is transformed in the complex baseband and by correlating the pilot signal of the CDMA baseband signal with the pn-sequence, the point in time of the start of the pilot signal is captured. By subtracting the existing determined times, it is possible thereby, to determine the point in time of arrival of the trigger threshold relative to the pilot signal of the CDMA.

Advantageously, before the correlation with the pn-sequence a synchronization of the symbolic point of time is carried out. Further, there is executed before the said synchronization of the symbolic point of time, a resampling of a whole number multiple of the sampling of the sequence of the pilot signal.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
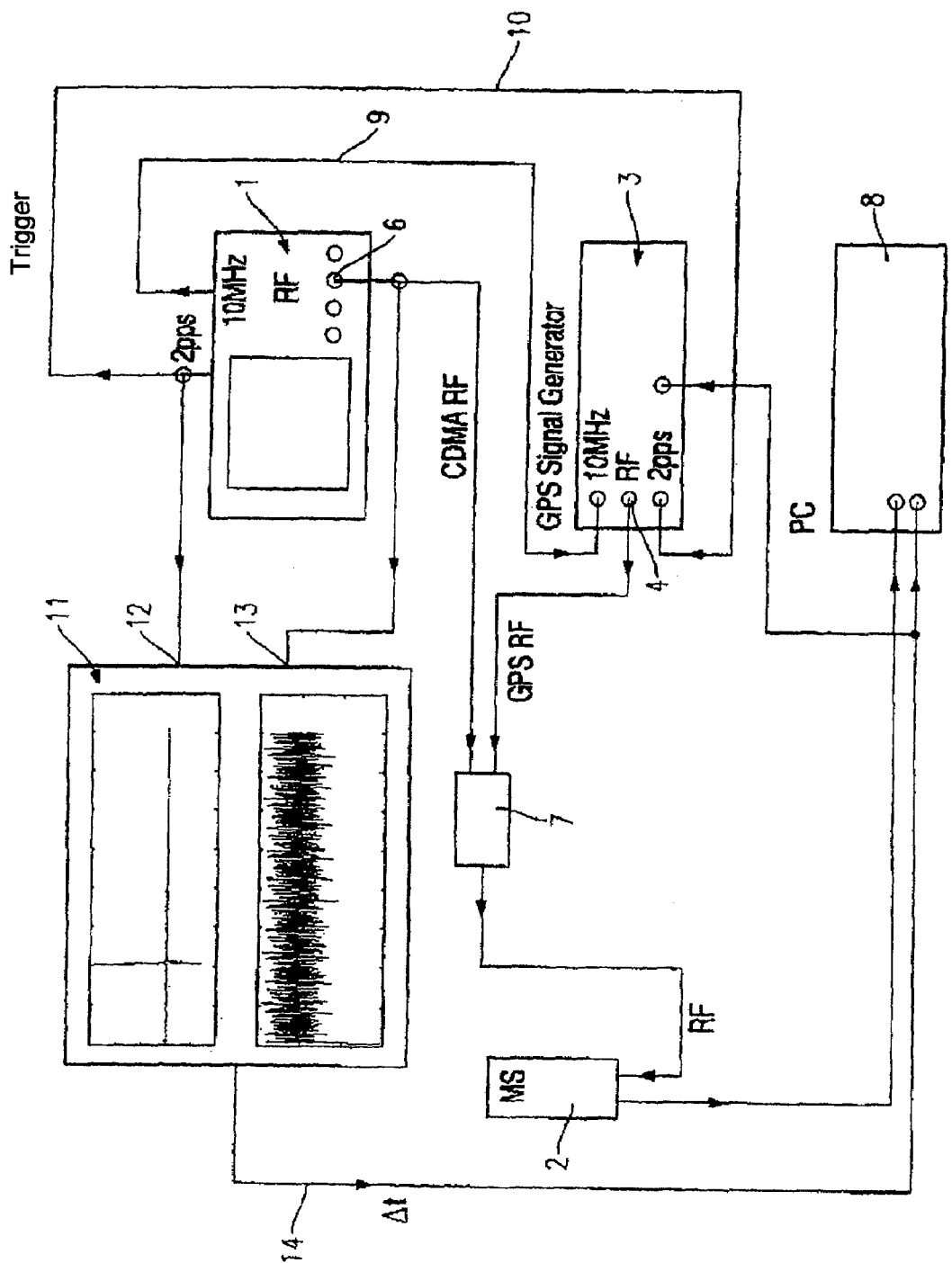
FIG. 1 is an application example of the invented process.

FIG. 1 shows an example of an application example of the invented process. Modern mobile stations of a wide band CDMA mobile radio network possess a GPS send/receiver apparatus, so that the mobile radio network can transmit the position of the mobile station, particularly in the case of an emergency. The additional GPS function and the basic functions should be tested with the testing construction presented in FIG. 1.

A CDMA testing unit resembles a CDMA-Basis-Station and serves for the testing of a mobile station 2. Further, a GPS signal generator is available, on the high frequency output port 4 of which, a GPS high frequency station signal GPS RF can be picked up. The CDMA high frequency signal is taken from the high frequency output port 6 of the of the CDMA test unit 1 and, along with the high frequency signal GPS RF of the GPS signal generator 3 is merged into a common high frequency signal RF in a power combiner 7. This said combined signal RF is conducted to the mobile station 2, which is under test. An output port of the mobile station 2 is connected to a computerized evaluation device 8.

The CDMA test unit 1 and the GPS signal generator 3 are additionally connected by means of a first connection line 9, by which the GPS signal generator receives, from the CDMA test unit 1, a reference frequency, in the present embodiment, this being 10 MHz. A second connection line 10 allows the GPS signal generator 3 to receive a trigger signal from the CDMA test unit 1 at, for example, two pulses per second (2 pps). By means of this trigger signal the GPS signal generator 3 is enabled to synchronize its timing with the CDMA signal. To carry this out, there is an unconditional presupposition, that the time lapse of the trigger signal is known in reference to a defined point in time of the CDMA signal, for example, this being the start of the pilot signal. This time lapse Δt must be measured once and then can be input into the GPS signal generator 3 and/or the evaluation device 8. Alternatively, the lapse Δt can be transmitted over a line 14 to the GPS signal generator and/or the computerized evaluation device 8. The object of the present invention is the measurement of this time lapse Δt.

For the measurement of the lapse Δt, the trigger signal produced by the CDMA test unit 1 is connected to a first entry port 12 of a 2-channel memory oscilloscope 11 and to a second entry port 13 of the 2 channel memory oscilloscope 11, the high CDMA frequency signal of the CDMA test equipment 1 is connected. Now, respectively, a signal sample of both the trigger signal and the CDMA high frequency signal is simultaneously scanned for a sufficient length of time and stored in an internal memory of the 2-channel, memory oscilloscope 11. The corresponding curve presentation thereof is shown in FIG. 1.

While the point of triggering time in the time area can still be relatively well recognized, the high frequency signal within the time area of the beginning of the pilot signal cannot be found without further effort.

Accordingly, there are different inventive operations necessary, which, however, after the storage of the CDMA high frequency, can be carried out off line in the form of a mathematical evaluation program, so that no additional hardware expense need be involved.

Figure 2:
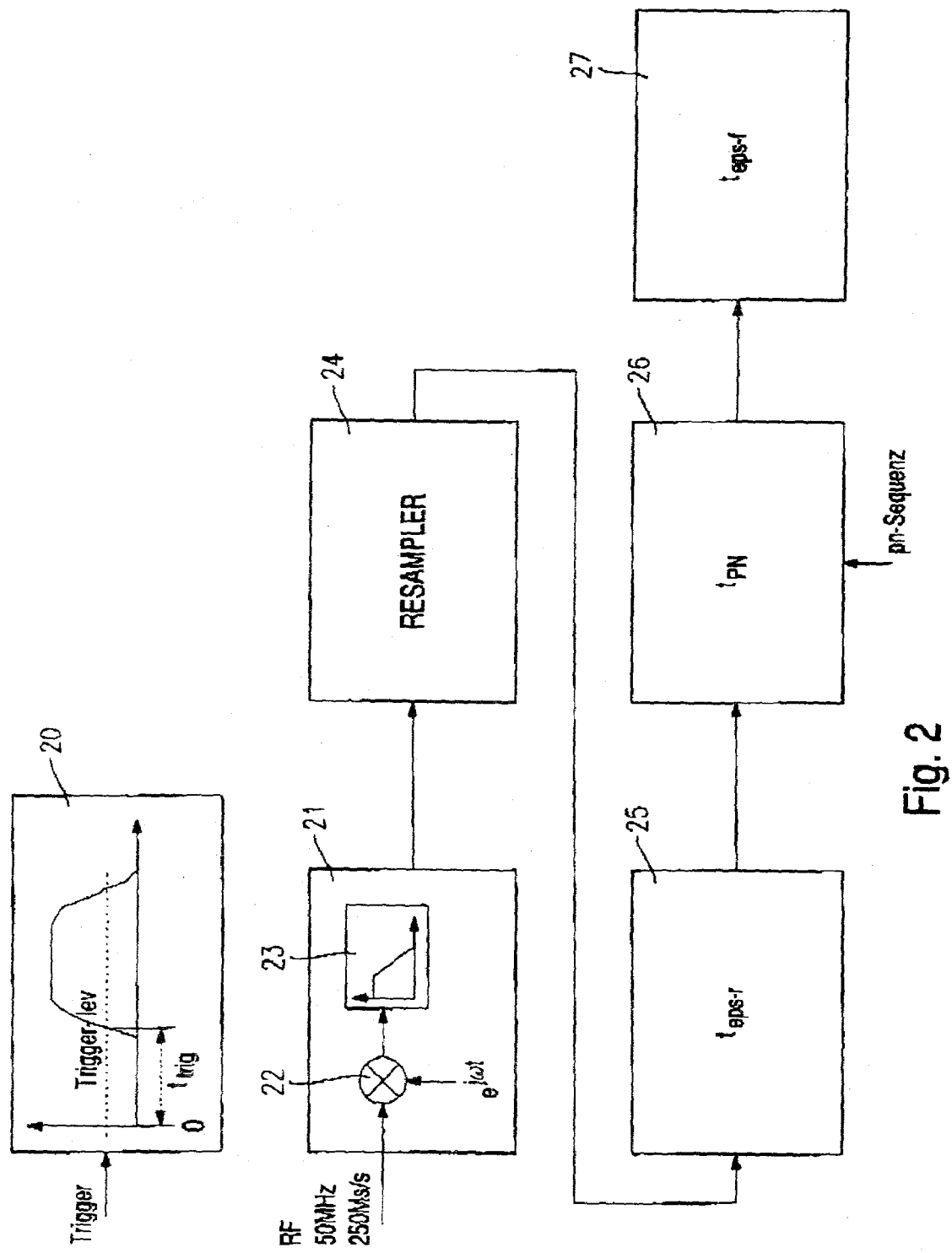
FIG. 2 is a block flow diagram of the invented process.

FIG. 2 shows a schematic, block type flow chart of the process of the invention.

In a block 20, the time $t_{trig}$ is captured up to the reaching of a specified trigger threshold "trigger-lev" as compared with an actual time zero point 0, set for instance at the beginning of the measurement.

The CDMA high frequency signal, on the other hand, is transformed in the complex baseband in a block 21. To the extent that, the memory oscilloscope 11 cannot cope with a frequency of up to some GHz—which actually occurs with a CDMA mobile radio signal—and achieve the necessary results, then the output frequency of the CDMA high frequency signal for the present measurement purpose, will be pulled down from the existing several GHz of a real mobile radio signal to several MHz, this now offset value being, in the chosen embodiment, 50 MHz. When this is done, considerations start from the point, that the group running time through the high frequency components is nearly free of frequency-dependence. This refers, for instance, to the running time through the I/Q (internal acknowledgment) modulator, through the driver-stage and through the load-reinforcement, so that the result determined upon the dropping of the frequency, is applicable to the real mobile radio signal.

The CDMA high frequency signal and a complex rotation indicator $e^{jwt}$ are conducted to a multiplier device 22, so that the CDMA high frequency signal in the complex base-band is transformed and by means of a deep pass 23 is filtered.

Advantageously, to the block 21 is connected a resampler 24, with which a sampling rate conversion is carried out to obtain a whole-number multiple—in the embodiment example, this is four-fold—of the sample rate of the sequence of the pilot signal contained in the CDMA signal.

In an advantageously provided block 25, is executed a synchronization of the symbolic point in time, that is, at the exit of the block 25, a signal is created, by which, respectively, one of the (in the embodiment example) four sampling values per symbol fall together with a symbolic time point. Thereby, a rough estimated value of the said lapse time $t_{eps-r}$ is determined.

In a block 26 is made a correlation of the CDMA baseband with a cyclic reference sequence (pn-sequence). Thereby, the time related situations of the pilot signal, relative to the pn-sequence can be determined. The time-point of the correlation maximum is $t_{pn}$.

In an advantageously provided block 27 is made a very close estimation by means of evaluation of the relative phase conditions. The close estimation acquired in this way is designated $t_{eps-f}$.

If, in a simplified embodiment example, the optional blocks 25 and 27 are not present, and the correlation block 26 determines the said lapse Δt directly in relation to the zero-point 0 of the measurement, then the relationship standing between the trigger signal and the start of the pilot signal of the CDMA high frequency signal is represented by the equation:

$$\Delta t = t_{pn} - t_{trig}$$

If, on the other hand, the blocks 25 and 27 should be present, and in the block 25 a rough prediction of the lapse Δt has been made, then the determined time-point $t_{pn}$, which has been determined by correlation in block 26, relates itself to the point in time determined through the said rough prediction in block 25, and the more refined estimation in the block 27 relates itself to the correlation point determined in the block 26, then, the following equation now obtains for the time lapse Δt between the trigger signal and the start of the pilot sequence:

$$\Delta t = t_{eps-r} + t_{pn} + t_{eps-f} - t_{trig}$$

The invented process excels by its simple mode of execution and the small expenditures required for hardware.

While the invention has been described in detail and with reference to specific examples thereof, it will be apparent to one skilled in the art that various changes and modifications can be made therein without departing from the spirit and scope thereof.

What is claimed is:

1. A process for determining a lapse in time between a trigger signal and a start of a cyclic sequence of a pilot signal of a code division multiple access (CDMA) high frequency signal, said process comprising:
   a) simultaneously scanning the trigger signal and the pilot signal;
   b) storing the scanned trigger signal and the scanned pilot signal;
   c) conveying the stored trigger signal and the stored pilot signal to an offline evaluation device;
   d) comparing the stored trigger signal with a trigger threshold at the offline evaluation device to capture a time ($t_{trig}$) to reach the trigger threshold;
   e) generating a CDMA baseband signal at the offline evaluation device by transforming the stored pilot signal of the CDMA high frequency signal into a complex baseband;
   f) correlating the CDMA baseband signal with a cyclic reference sequence at the offline evaluation device to capture the time ($t_{pn}$) up to the start of the cyclic sequence of the pilot signal;
   g) subtracting $t_{trig}$ from $t_{pn}$ at the offline evaluation device to determine the lapse in time; and
   h) conveying the determined lapse in time to a signal generator for synchronization of a signal from the signal generator to the CDMA high frequency signal.

2. The process of claim 1, further comprising, before step f), synchronizing the CDMA high frequency signal to a symbolic point in time.

3. The process of claim 2, further comprising, after step e), resampling the CDMA baseband signal at the offline evaluation device to determine a whole number multiple of the sample rate of the cyclic sequence of the pilot signal.

4. The process of claim 1, further comprising, before step f), resampling the CDMA baseband signal at the offline evaluation device to determine a whole number multiple of the sample rate of the cyclic sequence of the pilot signal.

* * * * *